(12) United States Patent
Uehara et al.

(10) Patent No.: US 8,320,041 B2
(45) Date of Patent: Nov. 27, 2012

(54) THREE-DIMENSIONAL IMAGE DISPLAY DEVICE AND THREE-DIMENSIONAL IMAGE DISPLAY METHOD

(75) Inventors: Shin-ichi Uehara, Tokyo (JP); Masao Imai, Tokyo (JP); Nobuaki Takanashi, Tokyo (JP); Setsuo Kaneko, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 10/782,928

(22) Filed: Feb. 23, 2004

(65) Prior Publication Data

US 2004/0165264 A1  Aug. 26, 2004

(30) Foreign Application Priority Data

Feb. 25, 2003  (JP) ................... 2003-046977

(51) Int. Cl.
*G02B 27/22* (2006.01)
(52) U.S. Cl. .................... 359/463; 359/462; 348/59
(58) Field of Classification Search .................. 359/463, 359/462, 464, 619; 348/51, 59
See application file for complete search history.

(56) References Cited

U.S. PATENT DOCUMENTS

| | | | | |
|---|---|---|---|---|
| 4,987,487 A | * | 1/1991 | Ichinose et al. | 348/59 |
| 5,315,377 A | * | 5/1994 | Isono et al. | 348/51 |
| 5,528,420 A | * | 6/1996 | Momochi | 359/463 |
| 5,852,512 A | * | 12/1998 | Chikazawa | 359/463 |
| 6,992,693 B2 | * | 1/2006 | Tajika et al. | 348/59 |
| 7,301,517 B2 | * | 11/2007 | Hebiguchi et al. | 345/90 |

FOREIGN PATENT DOCUMENTS

| | | |
|---|---|---|
| GB | 2 352 573 A | 1/2001 |
| JP | 7-72561 A | 3/1995 |
| JP | 7-80106 | 3/1995 |
| JP | 7-181429 A | 7/1995 |
| JP | 8-36145 A | 2/1996 |
| JP | 09-15532 A | 1/1997 |
| JP | 2001-330713 A | 11/2001 |
| JP | 2003-29205 A | 1/2003 |
| JP | 2004-258163 A | 9/2004 |

OTHER PUBLICATIONS

"Visual Acuity" Wikipedia, The free encyclopedia http://en.wikipedia.org/wiki/Visual_acuity.*
Nikkei Electronics No. 838, Jan. 6, 2003, (Table 1), pp. 26-27.
Denshi Gijutsu, Dec. 1995 issue, pp. 79-83.
Eizō Jōhō Media Gakkai Gijutsu Hokoku, vol. 22, No. 56, 1998, pp. 7-11 ("2.3.3 Three-dimensional space display and characteristics of stereoscopic vision," etc.).
Japanese Office Action mailed Jun. 5, 2012 for corresponding Japanese Patent Application No. 2009-027927.

* cited by examiner

Primary Examiner — Audrey Y Chang
(74) Attorney, Agent, or Firm — Sughrue Mion, PLLC

(57) ABSTRACT

A three-dimensional image display device is provided with a display panel. The display panel is provided with a plurality of pixels for the right eyes and pixels for the left eye, and light emitted from the pixels for the right eye is made incident to the right eye of a viewer and light emitted from the pixels for the left eye is made incident to the left eye. When the normal distance between the display panel and the viewer is set to a maximum observation distance, D (mm), then definition X (dpi) of at least one of a vertical direction and a horizontal direction on a display plane of the display panel is set as in the following expression.

$$X \geq \frac{25.4}{D \times \tan(1')}$$

20 Claims, 11 Drawing Sheets

THREE-DIMENSIONAL IMAGE DISPLAY DEVICE AND THREE-DIMENSIONAL IMAGE DISPLAY METHOD

BACKGROUND OF THE INVENTION

1. Field of the Invention

The present invention relates to a three-dimensional image display device and a three-dimensional image display method, where special eyeglasses are not used, particularly to a three-dimensional image display device and a three-dimensional image display method, where the visibility of a three-dimensional image is improved aiming at the reduction of viewer's fatigue.

2. Description of the Related Art

Conventionally, a display device capable of displaying three-dimensional images has been under study. Regarding binocular vision, Euclid who is a Greek mathematician considered in 280 B.C. that "Binocular vision is a sensation obtained when both the right and the left eyes simultaneously look at different images of a same object viewed from different directions" (refer to a literature "Three-dimensional display" written by Chihiro Masuda, published by Sangyo Tosho K.K., for example). Specifically, as a function of the three-dimensional image display device, it is necessary that images having parallax from each other be individually presented for both of the right and left eyes of the viewer.

Many three-dimensional image display methods are being studied as a method to specifically realize the function. The three-dimensional image display methods are largely divided into methods using eyeglasses and methods using no eyeglasses. Although the methods using eyeglasses are an anaglyph method using color difference, a polarized eyeglasses method using polarization, and the like, these methods essentially have to give viewers burdens of wearing eyeglasses, so that the study of the methods using no eyeglasses has been actively done in recent years.

The eyeglass-less methods are a lenticular lens method, a parallax barrier method, and the like. The lenticular lens method was invented by Ives, et al. around 1910 as described in the above-described literature. FIG. 1 is a perspective view showing the lenticular lens, and FIG. 2 is an optical model diagram showing a three-dimensional image display method using the lenticular lens. As shown in FIG. 1, one surface of the lenticular lens 21 is in flat surface and hog-backed convex portions (cylindrical lenses) 22 extending in one direction are formed in plural numbers on the other surface such that their longitudinal directions become parallel with each other.

Then, as shown in FIG. 2, a lenticular lens 21, a display panel 6, and a light source 8 are arranged sequentially from a viewer side, and the pixels of the display panel 6 are located on a focal plane of the lenticular lens 21. Pixels 23 displaying an image for the right eye 41 and pixels 24 displaying an image for the left eye 42 are alternately arrayed on the display panel 6. At this point, a group that consists of the pixels 23, 24 that are adjacent to each other corresponds to each convex portion 22 of the lenticular lens 21. Thus, light emitted from the light source 8 to transmit each pixel is distributed by the convex portions 22 of the lenticular lens 21 into directions for the right and left eyes. This allows the right and left eyes to recognize images that are different from each other, which enables the viewer to recognize the three-dimensional image.

On the other hand, Berthier invented the parallax barrier method in 1896, and Ives proved the idea in 1903. FIG. 3 is an optical model diagram showing the three-dimensional image display method using a parallax barrier. As shown in FIG. 3, a parallax barrier 5 is a barrier (light shield) on which a large number of thin vertically striped openings, that is, slits 5a are formed. And the display panel 6 is arranged near one surface of the parallax barrier 5. The pixels 23 for the right eye and the pixels 24 for the left eye are alternately arrayed on the display panel 6 in a direction orthogonal to the longitudinal direction of the slits. Further, the light source 8 is arranged near the other surface of the parallax barrier 5, that is, on the opposite side of the display panel 6.

The light, which has emitted from the light source 8, passed the openings (slits 5a) of the parallax barrier 5, and transmitted the pixels 23 for the right eye, becomes a light flux 81. In the same manner, the light, which has emitted from the light source 8, passed the slits 5a, and transmitted the pixels 24 for the left eye, becomes a light flux 82. At this point, a viewer's position from which the viewer can recognize a three-dimensional image is decided by a positional relation between the parallax barrier 5 and the pixels. Specifically, it is necessary that the right eye 41 of the viewer be within a passage region of all light fluxes 81 corresponding to a plurality of the pixels 23 for the right eye and the left eye 42 of the viewer be within the passage region of all light flux 82. This is a case where the midpoint 43 between the right eye 41 and the left eye 42 of the viewer positions in a square three-dimensional visible range 7 shown in FIG. 3.

Out of line segments in the three-dimensional visible range 7, which extend in the array direction of the pixels 23 for the right eye and the pixels 24 for the left eye, a line segment passing the intersection 7a of diagonal lines in the three-dimensional visible range 7 is the longest line segment. For this reason, when the midpoint 43 is located at the intersection 7a, latitude when the viewer's position shifts in either right or left direction becomes a maximum, and the position is most preferable as an observing position. Therefore, in the three-dimensional image display method, the distance between the intersection 7a and the display panel 6 is set as an optimal observation distance OD, and the viewers are recommended to view (observe) the image at this distance. Note that a virtual plane in the three-dimensional visible range 7, where the distance from the display panel 6 becomes the optimal observation distance OD is referred to as an optimal observation plane 7b. Thus, the light from the pixels 23 for the right eye and the pixels 24 for the left eye reaches the viewer's right eye 41 and left eye 42. Consequently, the viewer can recognize the image displayed on the display panel 6 as a three-dimensional image.

The parallax barrier method, when it was invented at first, had a problem that the parallax barrier had been an eyesore and caused low visibility because it was arranged between the pixels and the eyes. However, with the achievement of liquid crystal display devices in recent years, it has become possible to arrange the parallax barrier 5 on the rear side of the display panel 6 as shown in FIG. 3, and the visibility has been improved. Accordingly, the three-dimensional image display device of the parallax barrier method is actively studied.

A literature (Nikkei Electronics No. 838 issued on Jan. 6, 2003, pp. 26-27, Table 1) describes an example where a product has been commercialized using the parallax barrier method. This is a cellular phone mounting a 3D compatible liquid crystal display device, and the liquid crystal display device that constitutes the three-dimensional image display device has a size of diagonal 2.2 inches, which has the number of display dots of 176 dots in horizontal directions and 220 dots in vertical directions. Then, a liquid crystal panel that serves as the parallax barrier is provided, and turning the liquid crystal panel on/off allows it to display a three-dimensional image and a two-dimensional image. According to the product catalog and the user's manual of this product, the optimal observation distance in three-dimensional image display is 400 mm. In other words, a user can watch the three-dimensional image when observing it from a position 40 cm apart from the liquid crystal display device. Display definition of the conventional three-dimensional image display in two-dimensional image display is 128 dpi in both vertical and horizontal directions, but because an image for the left eye and an image for the right eye are displayed by arraying alternately in vertical striped shapes as described above during three-dimensional image display, the definition in the horizontal directions is 64 dpi that is half the definition in the vertical directions (128 dpi).

However, the above-described prior art has the following problems. Specifically, viewing three-dimensional images causes fatigue to the viewer's eyes and the like as described in the product catalog and the user's manual of the above-described conventional product. In other words, the viewer becomes tired by viewing the three-dimensional images for a long time.

SUMMARY OF THE INVENTION

An object of the present invention is to provide a three-dimensional image display device and a three-dimensional image display method, which cause less fatigue to viewers and have superior visibility.

The three-dimensional image display device according to the present invention has: a display panel where a plurality of pixel sections, which include pixels displaying an image for the right eye and pixels displaying an image for the left eye, are arrayed in a matrix state; and optical unit that emits light emitted from the pixels displaying the image for the right eye and light emitted from the pixels displaying the image for the left eye in directions different from each other. Then, when the distance between the most distant point from the display panel in a three-dimensional visible range, where the light emitted from the pixels displaying the image for the right eye is made incident to the right eye and the light emitted from the pixels displaying the image for the left eye is made incident to the left eye by positioning the midpoint between the viewer's right eye and left eye in the range, and the display panel is set to D (mm), the definition of the pixel sections in at least one array direction out of the array directions of the pixel sections of the display panel is set to X (dpi), the distance D and the definition X satisfy the following expression 1.

$$X \geq \frac{25.4}{D \times \tan(1')} \quad \text{(Expression 1)}$$

In the present invention, the definition X (dpi) of the pixel sections including a plurality of pixels, that is, each definition of the pixels for the right eye and the pixels for the left eye is set to a value, where 25.4 (mm/inch) that is a conversion constant between inch and millimeter is divided by a product of the distance D (mm) and the tangent of an angle of 1 minute, or more. Thus, the array period of pixels can be set to no more than a minimum viewing angle of a viewer having eyesight of 1.0. Note that the definition means the number of dots per the length of 1 inch, which is a number proportional to a reciprocal of the array period of the pixel sections. As a result, this prevents the viewer from being unable to recognize the feature point of the three-dimensional image. Consequently, the visibility of the three-dimensional image improves and the fatigue of the viewer is lightened. Further, not only the visibility of three-dimensional static images but also the visibility of three-dimensional moving pictures improves.

The inventors have committed themselves into experiments and research in order to solve the above-described problems in the prior art, and found out that there had been a fixed relationship between the definition of the three-dimensional image and the viewer's fatigue. Then, the inventors have achieved the present invention.

Finding correspondence between the feature points in the right and left images is cited as a part of indispensable processing that the viewer performs in recognizing the three-dimensional image. As described in a literature ("Three dimensional image and human science" edited by Hiroshi Harashima and issued by Ohmsha, Ltd.), perception of depth is believed to be conducted that the viewer finds corresponding feature points in the right and left images and calculates the depth based on the parallax of the feature points. Then, the inventors conducted thorough-study based on the fact and found out that the visibility of the three-dimensional images had drastically reduced when the viewer significantly lacks perception of the corresponding feature points in the right and left images, which had caused fatigue. Specifically, when the right and left eyes view the images having different parallax from each other, the viewer searches the corresponding feature points. In doing this, if the image significantly lacks the feature points, the viewer cannot take correspondence between the right and left images and becomes confused. The confusion induces binocular rivalry that which of the images observed by the right and left eyes is given priority. A state where the binocular rivalry occurs is an unstable state where binocular fusion cannot be done, so that the visibility of the three-dimensional images reduces and the viewer becomes tired.

Therefore, to facilitate binocular vision and reduce viewer's fatigue, the reduction of the corresponding feature points in the right and left images is prevented. Thus, the viewer can easily find the feature points in the right and left images, the binocular rivalry is prevented, and as a result, the binocular fusion is easily performed.

Meanwhile, the inventors studied as to until which level the lack of feature points is allowable. To completely prevent the lack of feature points, the definition of the three-dimensional image needs to be no less than the resolution by the eyesight of viewer. This avoids a phenomenon that the viewer cannot view the feature points, which he/she should be able to view, due to low definition of the images and the lack of recognition of the feature points. The relationship between the viewer's eyesight and the minimum viewing angle that the viewer can identify is given by the following expression 2.

Eyesight=1/minimum viewing angle (minutes)     (Expression 2)

General eyesight is 1.0, and the minimum viewing angle of the viewer having eyesight of 1.0 is 1 minute, that is, (1/60) degree, from the above-described expression 2. Then, in this case, the resolution of the viewer at the observation distance D (mm) is D×tan(1 min.)(mm). Accordingly, by setting the definition of the three-dimensional image to 25.4/(D×tan(1 min.)(dpi)) or more, the fundamental period of image becomes smaller than the resolution. Thus, the viewer can view the corresponding feature points, which he/she should be able to view, and consequently, he/she can easily recognize the feature points and the lack of feature points can be prevented.

Furthermore, the inventors also focused attention on the definition of the three-dimensional image in the vertical and horizontal directions and made committed examinations, and found out that preventing the lack of feature points only in one direction out of two directions orthogonal with each other, which constitutes a display plane displaying the three-dimensional image, exerted effect in promoting the binocular fusion.

Specifically, when the relationship between the definition X of each pixel and the observation distance D is set so as to satisfy the above-described expression 1 in displaying the three-dimensional image, special effect beyond effect obtained simply by improving the definition of images is obtained, the visibility of three-dimensional image improves-significantly, and thus the fatigue of viewer is lightened remarkably. Further, if the definition of image is to be simply improved, the definition must be improved in all directions of the image to obtain enough effect. However, the definition in all directions does not need to satisfy the expression 1 to obtain effect by preventing the above-described lack of feature points, but satisfying the expression 1 at least in one direction is enough.

In the three-dimensional image display device according to the present invention, when the definition of the pixel sections in another orthogonal array direction, which crosses the one array direction out of the array directions of the pixel section, is set to Y (dpi), it is preferable that the distance D and the definition Y satisfy the following expression 3. Thus, in two orthogonal directions on the display panel, which cross each other, the array period of each pixel becomes no more than the minimum viewing angle of the viewer, α, (where α=1' in Expressions 1 and 3; and where α is shown in FIG. 11). The lack of the corresponding feature points in the image for right eye and the image for left eye can be prevented more completely. As a result, the visibility of the three-dimensional image further improves to lighten the viewer's fatigue even more.

$$Y \geq \frac{25.4}{D \times \tan(1')} \quad \text{(Expression 3)}$$

Another three-dimensional image display device according the present invention has: a display panel where a plurality of pixel sections, which include pixels displaying an image for the right eye and pixels displaying an image for the left eye, are arrayed in a matrix state; and optical unit that emits light emitted from the pixels displaying the image for the right eye and light emitted from the pixels displaying the image for the left eye in directions different from each other. Then, the distance between the most distant point from the display panel in a three-dimensional visible range, where the light emitted from the pixels displaying the image for the right eye is made incident to the right eye and the light emitted from the pixels displaying the image for the left eye is made incident to the left eye by positioning the midpoint between the viewer's right eye and left eye in the range, and the display panel is 500 mm or more, and the definition of the pixel sections at least in one array direction out of the array directions of the pixel sections is 175 dpi or more.

In the present invention, by shortening the distance D to 500 mm, the viewer can view the image as he/she moves while holding the three-dimensional image display device. As a result, portable devices can mount the three-dimensional image display device thereon. Further, at this point, by setting the definition of the pixel sections to 175 dpi or more, the array period of the pixel sections becomes no more than the minimum viewing angle of the viewer having the eyesight of 1.0. Consequently, this can prevent the viewer from being unable to recognize the feature point of the three-dimensional image, the visibility of the three-dimensional image improves, and the fatigue of the viewer is lightened. Note that the portable devices may be a cellular phone, a portable terminal, a PDA (Personal Digital Assistance), a game device, a digital camera, or a digital video camera.

Furthermore, it is preferable that the display panel be a liquid crystal display panel. Moreover, the optical unit may be a parallax barrier where a plurality of slits, which are arranged for each row of the pixel sections and which extend along an extending direction of the row, are formed. Alternatively, the optical unit may be a lenticular lens that is arranged on the viewer side of the display panel, provided with a plurality of cylindrical lenses arranged for each row of the pixel sections and extended along an extending direction of the row.

The three-dimensional image display method according to the present invention is a three-dimensional image display method in which one pixel included in each pixel section, a plurality of the pixel sections arrayed in a matrix state on the display panel, displays an image for the right eye and the other pixel displays an image for the left eye, the optical unit emits light emitted from the pixels displaying the image for the right eye and light emitted from the pixels displaying the image for the left eye in directions different from each other, and the viewer positions the midpoint between the right eye and the left eye in the three-dimensional visible range where the light emitted from the pixels displaying the image for the right eye is made incident to the right eye and the light emitted from the pixels displaying the image for the left eye is made incident to the left eye. Then, when the distance between the midpoint and the display panel is set to D (mm) and the definition of the pixel sections in at least one array direction out of the array directions of the pixel sections of the display panel is set to X (dpi), the distance D and the definition X satisfy the expression 1.

Another three-dimensional image display method according to the present invention is a three-dimensional image display method in which one pixel included in each pixel section, a plurality of the pixel sections arrayed in a matrix state on the display panel, displays an image for the right eye and the other pixel displays an image for the left eye, the optical unit emits light emitted from the pixels displaying the image for the right eye and light emitted from the pixels displaying the image for the left eye in directions different from each other, and the viewer positions the midpoint between the right eye and the left eye in the three-dimensional visible range where the light emitted from the pixels displaying the image for the right eye is made incident to the right eye and the light emitted from the pixels displaying the image for the left eye is made incident to the left eye. Then, the distance between the midpoint and the display panel is set to 500 mm or more and the definition of the pixel sections in at least one array direction out of the array directions of the pixel sections of the display panel is set to 175 dpi or more.

According to the present invention, by setting the relationship between the definition of pixels and the observation distance as described above, the visibility of three-dimensional image improves significantly, the fatigue of viewer is lightened, and particularly, the visibility of three-dimensional moving pictures improves.

DETAILED DESCRIPTION OF THE PREFERRED EMBODIMENTS

Figure 1:
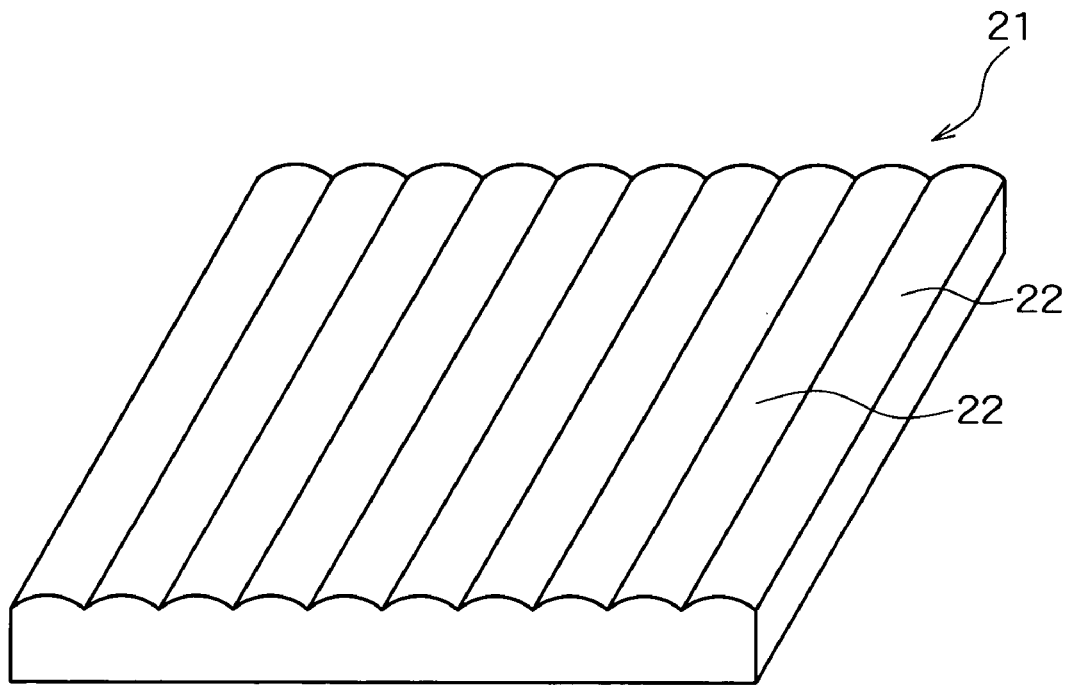
FIG. 1 is a perspective view showing a lenticular lens.
Figure 2:
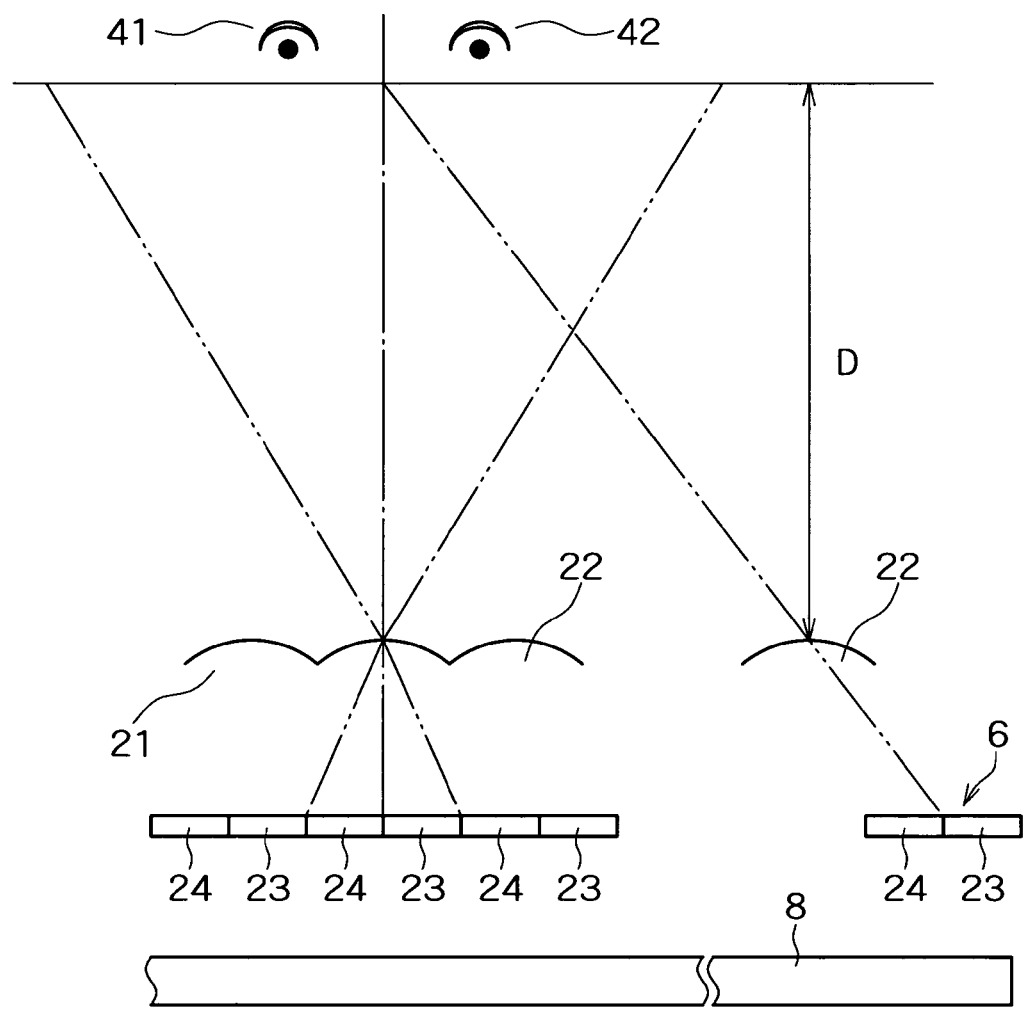
FIG. 2 is a view showing an optical model of a three-dimensional image display method using the lenticular lens.
Figure 3:
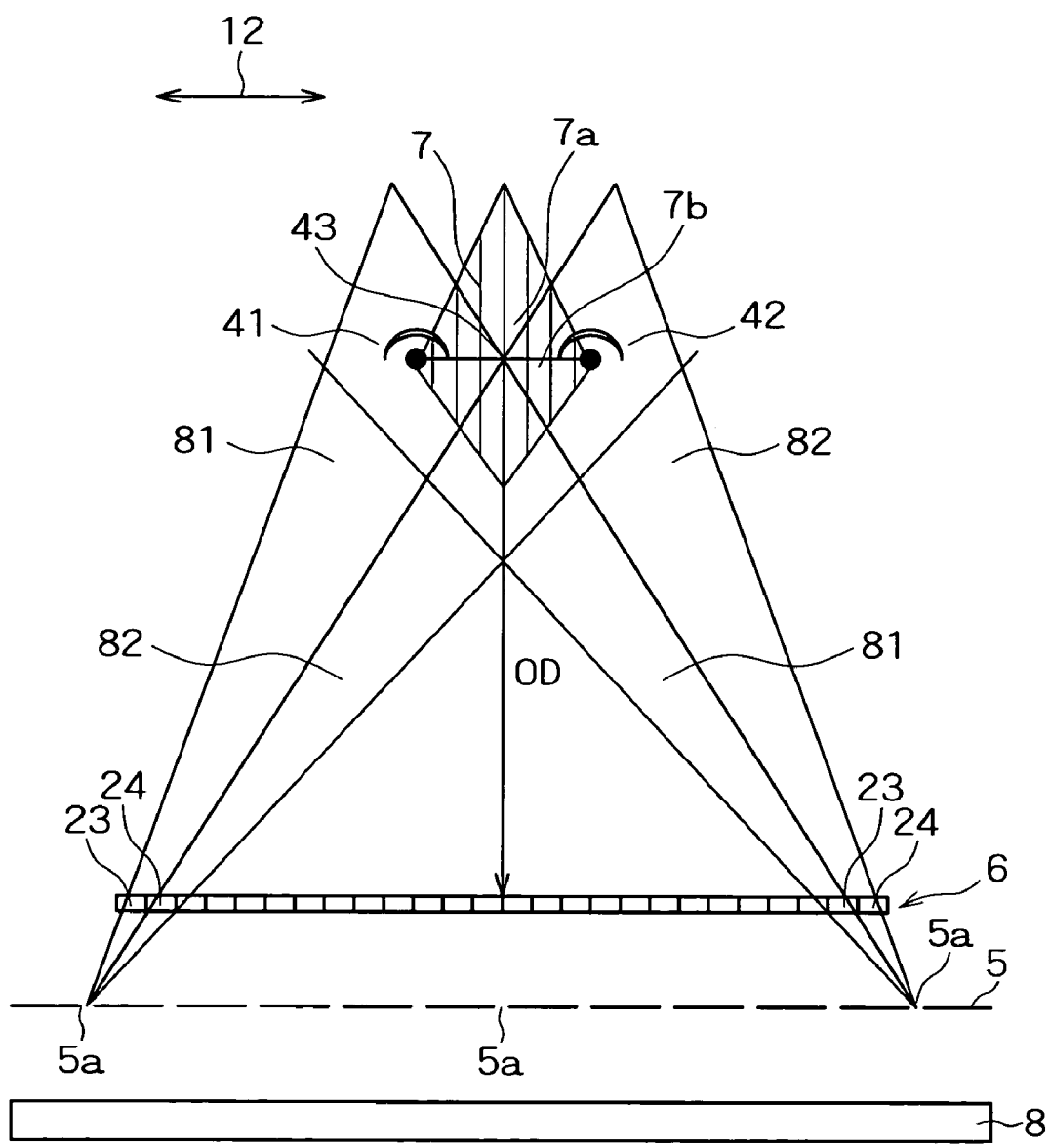
FIG. 3 is a view showing an optical model of a three-dimensional image display method using the parallax barrier.
Figure 4:
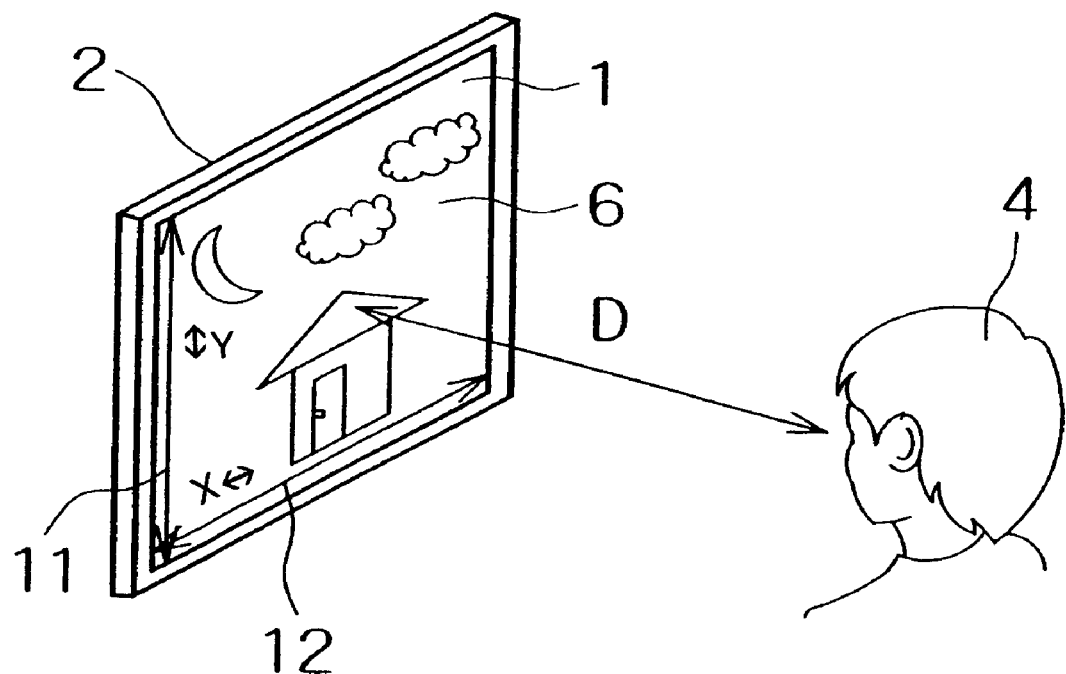
FIG. 4 is a perspective view showing the three-dimensional image display method in a first embodiment of the present invention.
Figure 5:
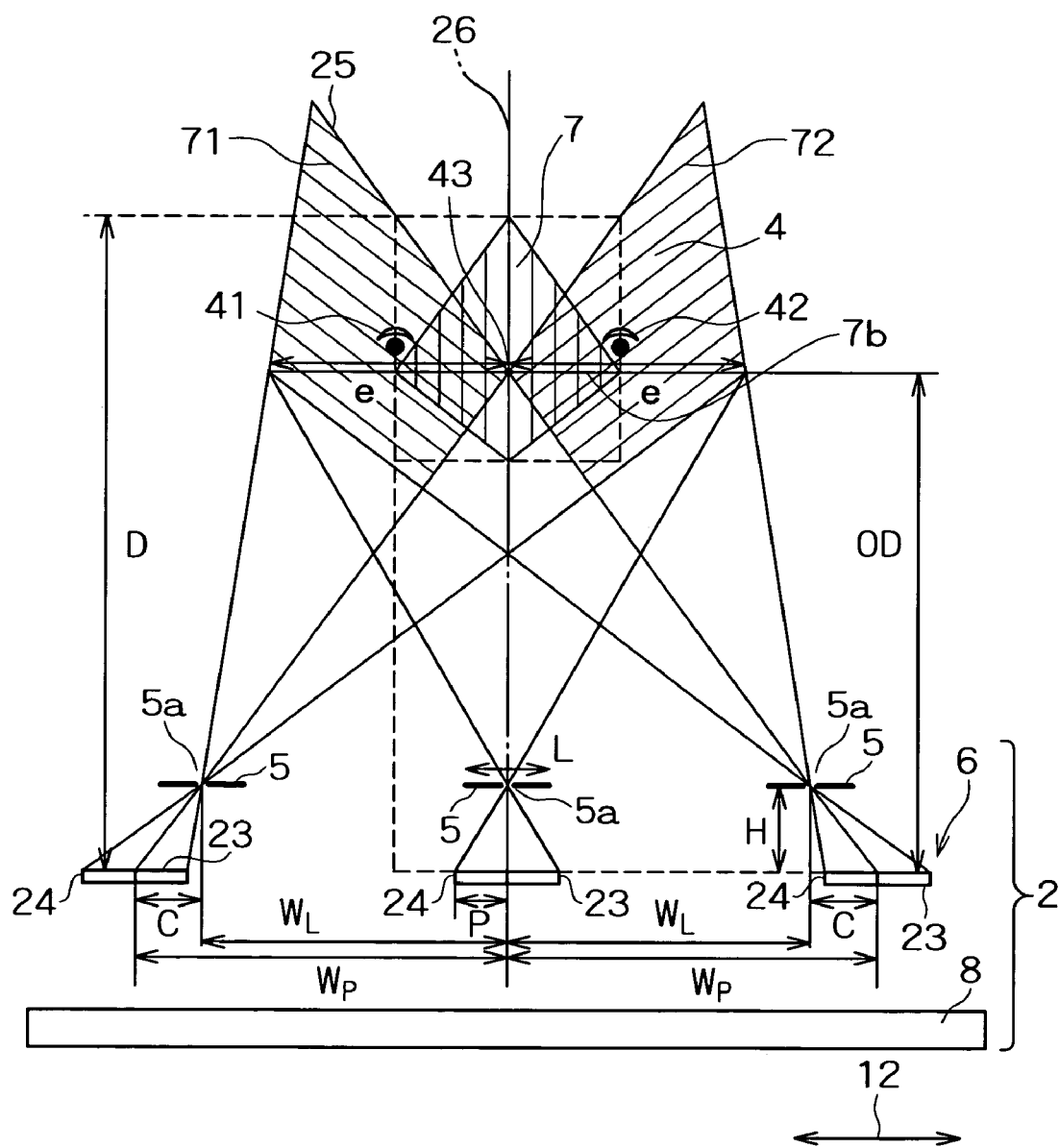
FIG. 5 is a view showing an optical model of the three-dimensional image display device in this embodiment, which shows a case where the width of slits is negligibly small.
Figure 6:
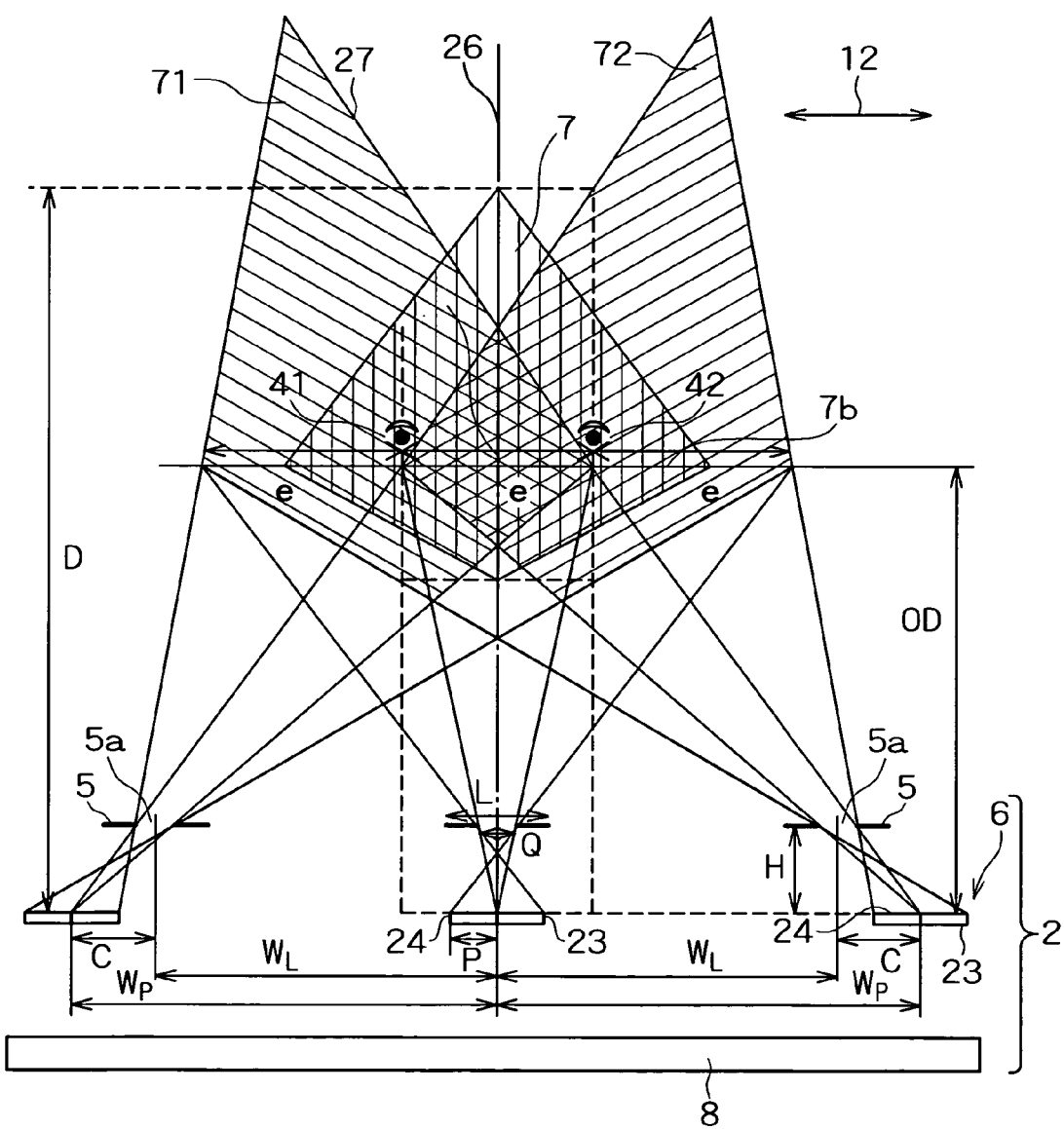
FIG. 6 is a view showing another optical model of the three-dimensional image display device in this embodiment, which shows a case where the width of slits is a limited value Q.
Figure 7:
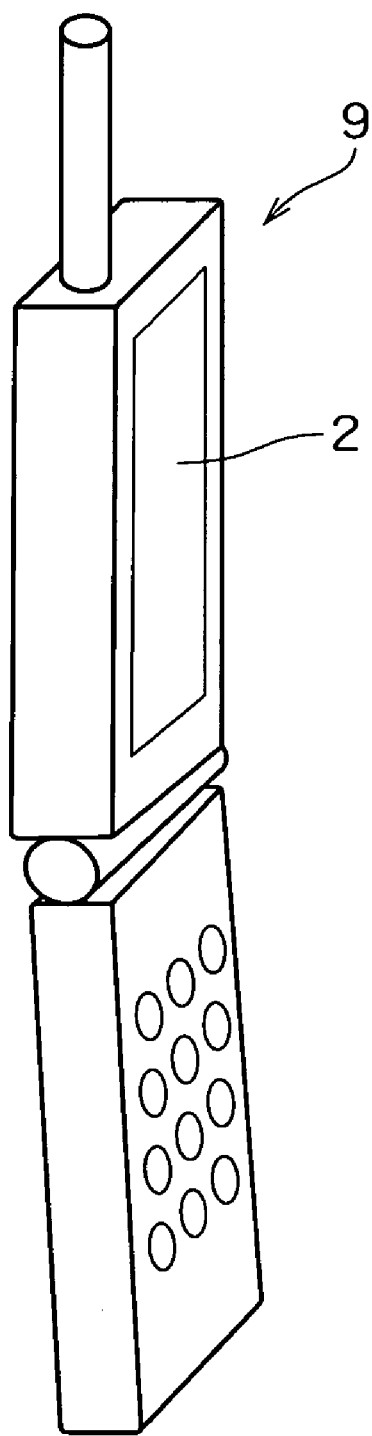
FIG. 7 is a perspective view showing a cellular phone in which the three-dimensional image display device according to the present invention is mounted.

Embodiments of the present invention will be specifically described referring to the accompanying drawings. First, a first embodiment of the present invention will be described. FIG. 4 is the perspective view showing the three-dimensional image display method in this embodiment, and FIGS. 5 and 6 are the views showing the optical models of the three-dimensional image display device of this embodiment. FIG. 5 shows the case where the width of slits of the parallax barrier is negligibly small, and FIG. 6 shows the case where the width of slits is the limited value Q. Further, FIG. 7 is the perspective view showing the cellular phone in which the three-dimensional image display device according to this embodiment is mounted. In this embodiment, a three-dimensional image display device 2 is provided as shown in FIGS. 4 and 5. The three-dimensional image display device 2 is provided with the parallax barrier 5, the display panel 6, and the light source 8 sequentially from a viewer side.

The light source 8 essentially consists of a sidelight (not shown) and an optical waveguide (not shown), for example, where the optical waveguide emits light emitted from the sidelight toward the display panel 6.

Further, the display panel 6 is a transmissive liquid crystal display panel, and its display plane is a rectangular shape whose one side extends in a vertical direction 11 and the other side extends in a horizontal direction 12. On the display panel 6, a plurality of pixels are arrayed in the matrix state along the vertical direction 11 and the horizontal direction 12. A part of a plurality of the pixels 23 is the pixels for the right eye displaying the image for the right eye and a remaining part is the pixels 24 for the left eye displaying the image for the left eye. Then, pixel groups as the pixel sections that consist of the pixels 23 for the right eye and the pixels 24 for the left eye are arrayed in the matrix state along the vertical direction 11 and the horizontal direction 12 on the display panel 6. Specifically, the pixels 23 for the right eye and the pixels 24 for the left eye are alternately arrayed along the horizontal direction 12, the pixels 23 for the right eye are arrayed along the vertical direction 11, and the pixels 24 for the left eye are also arrayed along the vertical direction 11.

Furthermore, on the parallax barrier 5, one slit 5a is formed corresponding to a pair of rows that consists of a row of the pixels 23 for the right eye and a row of the pixels 24 for the left eye. In other words, the longitudinal direction of the slits 5a extend in the vertical direction 11, and the number of slits 5a is the same as the number of pairs of the pixels 23 for the right eye and the pixels 24 for the left eye, where each pair consists of each row of the pixels, and the slits 5a are parallel with each other and arrayed in the horizontal direction 12 with an interval from each other. Note that the parallax barrier 5 is a glass plate on the surface of which a metal film is formed, and the slits 5a are portions that the metal film is patterned and removed in linear shapes.

Next the definition of the observation distance in this embodiment will be described. First, as shown in FIG. 5, description will be described for a case where the width of the slits 5a is minimal and negligible. An array pitch of the slits 5a of the parallax barrier 5 is set to L and the distance between the display panel 6 and the parallax barrier 5 is set to H. Further, an array pitch of the pixels is set to P. As described above, in the display panel 6, since two pixels, that is, each one of the pixel 23 for right eye and the pixel 24 for left eye is arranged as a pixel group pair, the array pitch of the pixel groups is 2P. Because the array pitch L of the slits 5a and the array pitch P of the pixel groups are mutually related, one pitch is determined based on the other one. Generally, since it is often the case that the parallax barrier is designed for the display panel, the array pitch P of the pixels is treated as a constant.

Further, an area where the light from all pixels 23 for the right eye reaches is a right eye area 71 and an area where the light from all pixels 24 for the left eye reaches is a left eye area 72. The viewer can recognize the three-dimensional image when he/she positions the right eye 41 and the left eye 42 in the right eye area 71 and the left eye area 72, respectively. However, since the binocular interval of the viewer is fixed, he/she cannot position the right eye 41 and the left eye 42 severally on any position of the right eye area 71 and the left eye area 72, such position is limited to a region where the binocular interval can be held at a fixed value. Specifically, binocular vision is realized only when the midpoint 43 between the right eye 41 and the left eye 42 is located within the three-dimensional visible range 7. The length of the three-dimensional visible range 7 along the horizontal direction 12 becomes a maximum at a position where the distance from the display panel 6 is the optimal observation distance OD, so that latitude when the viewer's position is shifted in the horizontal direction 12 becomes a maximum. For this reason, the position where the distance from the display panel 6 becomes the optimal observation distance OD is the most ideal observing position. Further, a virtual plane of the three-dimensional visible range 7, where the distance from the display panel 6 is the optimal observation distance OD, is set as an optimal observation plane 7b. Still further, an expanded projection width of one pixel on the optimal observation plane 7b is set as a binocular interval e. Note that an average value of the viewers' binocular interval is 65 mm, for example.

Next, the distance H between the parallax barrier 5 and the display panel 6 is determined using the each of the above-described values. The following expression 4 holds based on the geometrical relationship shown in FIG. 5, and thus the distance H is found as shown in the following expression 5.

$$P:H=e:(OD-H) \quad \text{(Expression 4)}$$

$$H = OD \times \frac{P}{P+e} \quad \text{(Expression 5)}$$

Further, supposing the distance between the center of a pixel group located at the center in the horizontal direction 12 of the display panel 6 and the center of a pixel group located at the end in the horizontal direction 12 is $W_P$, and the distance between the centers of slits 5a severally corresponding to the pixel groups is $W_L$, the difference C between the distance $W_P$ and the distance $W_L$ is given by the following expression 6. Further, supposing the number of pixels included in the distance $W_P$ of the display panel 6 is 2m, the following expression 7 holds. Furthermore, since the following expression 8 holds from the geometrical relationship, the pitch L of the slits 5a of the parallax barrier 5 is given by the following expression 9.

$$W_P - W_L = C \quad \text{(Expression 6)}$$

$$W_P = 2 \times m \times P, W_L = m \times L \quad \text{(Expression 7)}$$

$$W_P : OD = W_L : (OD-H) \quad \text{(Expression 8)}$$

$$L = 2 \times P \times \frac{OD-H}{OD} \quad \text{(Expression 9)}$$

As described above, the binocular vision is realized when the midpoint 43 between the both eyes is located within the three-dimensional visible range 7. The distance between the most remote point in the three-dimensional visible range 7 from the display panel 6 and the display panel 6 is set as a maximum observation distance D. To calculate the maximum observation distance D, the distance between a point, which is remote from an optical system center line 26 by the distance of (e/2) in the left direction of the drawing in light ray 25 emitted from the left end of the pixel 23 for right eye located at the far right of the drawing on the display panel 6, and the display panel 6 is to be found, as shown in FIG. 5. The following expression 10 and expression 11 hold from the geometrical relationship shown in FIG. 5. Furthermore, the following expression 12 is calculated from the expression 8 and the following expression 11.

$$W_P : OD = \left(W_P + \frac{e}{2}\right) : D \quad \text{(Expression 10)}$$

$$D = OD \times \frac{W_P + \frac{e}{2}}{W_P} \quad \text{(Expression 11)}$$

$$D = \frac{H}{C} \times \left(W_P + \frac{e}{2}\right) \quad \text{(Expression 12)}$$

The above-described description has been made for the case where the width of the slit 5a is minimal and negligible, but the case has a problem that display is dark due to a narrow slit width although crosstalk between the image for left eye and the image for right eye is small. For this reason, a limited width is actually given to the slits 5a as shown in FIG. 6 to increase brightness of display. Next, the observation distance will be described when the width of the slits 5a is taken in consideration.

In FIG. 6, when an X-Y orthogonal coordinate system having the surface of the display panel 6 as an X axis and the optical system center line 26 as a Y axis, light ray 27, which is emitted from the left end of the pixel 23 for right eye located at the far right of the drawing on the display panel 6 and passes the right end of the slit 5a, is given by the following expression 13.

$$y = -\frac{H}{C - \frac{Q}{2}} \times x + \frac{H \times W_P}{C - \frac{Q}{2}} \quad \text{(Expression 13)}$$

At this point, the maximum observation distance D becomes a value of a Y coordinate at the intersection of the light ray 27 and x=(-e/2). Therefore, when x=(-e/2) is substituted in the expression 13, the maximum observation distance D is given by the following expression 14.

$$D = \frac{H}{C - \frac{Q}{2}} \times \left(W_P + \frac{e}{2}\right) \quad \text{(Expression 14)}$$

Further, since the following expression 15 holds from the geometrical relationship, the following expression 16 is derived from the expression 14 and the following expression 15.

$$\left(W_P - \frac{e}{2}\right) : OD = \left(W_P + \frac{e}{2}\right) : D \quad \text{(Expression 15)}$$

$$OD = \frac{H}{C - \frac{Q}{2}} \times \left(W_P - \frac{e}{2}\right) \quad \text{(Expression 16)}$$

In FIG. 6, the width Q of the slit 5a is set such that the expanded projection width of one pixel on the optimal observation plane 7b becomes 2e, that is, twice the viewer's binocular interval. If the width Q of the slits 5a becomes larger, the crosstalk between the image for left eye and the image for right eye occurs at all observation points on the optimal observation plane 7b, which eliminates observation points having no crosstalk. For this reason, the width Q of the slit is not generally made larger than this. Specifically, it should be understood that this condition is a case where the width Q of the slits takes the maximum value. The width Q of the slits can be described as the following expression 17 and expression 18 from the geometrical relationship. Note that the distance H between the parallax barrier 5 and the display panel 6 and the array period L of the slits 5a of the parallax barrier 5 can be found in the same manner as the expression 5 and expression 9.

$$Q:H=e:OD \quad \text{(Expression 17)}$$

$$Q = \frac{e \times H}{OD} \quad \text{(Expression 18)}$$

Note that the size of the three-dimensional visible range 7 depends on the latitude of the crosstalk and the aperture ratio of pixels, and the optical arrangement as shown in FIG. 6 is formed when the width Q of the slits 5a takes the maximum value as described above. At this point, the following expression 19 is derived from the expression 15.

$$D = OD \times \frac{W_P + \frac{e}{2}}{W_P - \frac{e}{2}} \quad \text{(Expression 19)}$$

Supposing the maximum observation distance D when the width Q of the slits is negligible is $D_{min}$ and the maximum observation distance D when the width Q of the slits takes the maximum value is $D_{max}$, the following expression 20 holds from the expression 11 and expression 19. The following expression 21 is derived from the expression 20 and expression 12.

$$\frac{D_{max}}{D_{min}} = \frac{W_P}{W_P - \frac{e}{2}} \quad \text{(Expression 20)}$$

$$D_{max} = \frac{H}{C} \times W_P \times \frac{W_P + \frac{e}{2}}{W_P - \frac{e}{2}} \quad \text{(Expression 21)}$$

As described above, the maximum observation distance D has been defined in the case where the width of the slits 5a is the smallest and the largest. Actually, the width of the slits is designed within a range between the above-described minimum value and maximum value depending on the latitude of crosstalk between the right and left images, the aperture ratio of pixels, the brightness of display, and the like. In such a case, the expanded projection width of one pixel is within a range from the binocular interval (e) to twice (2e) the binocular interval. Note that the above-described description is for the case where the opening portions of the parallax barrier are in the slit shape, but it can be applied for a case where the opening portions are in a pinhole shape as well.

As described, the maximum observation distance D of the three-dimensional image display device 2 has been defined based on the configuration of the three-dimensional image display device 2. With the maximum observation distance D, the definition X (dpi) of the display panel 6 in the vertical direction 11 is set so as to satisfy the expression 1. In short, the definition in the vertical direction 11, that is, the number of pixels 23 for the right eye per 1 inch is a value, where 25.4 (mm/inch) is divided by the product of the distance D (mm) and the tangent of the angle of 1 minute, or more. Table 1 shows typical values of the maximum observation distance D and the minimum values of the definition X.

TABLE 1

| Observation distance D (mm) | Definition X (dpi) |
| --- | --- |
| 200 | 437 |
| 300 | 291 |
| 400 | 218 |
| 500 | 175 |
| 600 | 146 |
| 1000 | 87 |

In this embodiment, the maximum observation distance D is set to 500 mm, for example, and the viewer should observe the three-dimensional image display device 2 at a distance of 500 mm or less from the display panel 6, which is a distance between 400 and 500 mm, for example. At this point, the definition 11 of the image for the right eye and the image for the left eye in the vertical direction 11 is severally set to 175 dpi or more, which is 230 dpi, for example. Further, the definition in the horizontal direction 12 is set to 115 dpi, for example. Furthermore, the size of the display plane of the display panel 6 is a diagonal 2.2 type, the length of the display plane in the vertical direction 11 is 45 mm, and the length in the horizontal direction 12 is 34 mm, for example. Still further, as shown in FIG. 7, the three-dimensional image display device 2 of this embodiment is mounted in a cellular phone 9, for example. Note that the three-dimensional image display device 2 may be mounted in the portable devices such as the portable terminal, the PDA, the game device, the digital camera, and the digital video camera.

Next, the operation of the three-dimensional image display device according to this embodiment, that is, the three-dimensional image display method will be described. As shown in FIGS. 4 and 5, the display panel 6 displays a three-dimensional image 1 first as the light source 8 turns on. Specifically, the pixels 23 for the right eye on the display panel 6 display the image for the right eye and the pixels 24 for the left eye display the image for the left eye. Next, a viewer 4 positions the midpoint 43 between the right eye 41 and the left eye 42 at an observation point in the three-dimensional visible range 7, which is an observation point 400 mm apart from the display panel 6, for example. At this point, the light source 8 outputs light toward the display panel 6, the light that has been made incident to the pixels 23 for the right eye of the display panel 6 transmits them, passes the slits 5a of the parallax barrier 5, and is made incident to the viewer's right eye 41. On the other hand, the light that has been made incident to the pixels 24 for the left eye of the display panel 6 transmits them, passes the slits 5a of the parallax barrier 5, and is made incident to the viewer's left eye 42. Thus, the viewer recognizes the three-dimensional image 1. Actually, the viewer 4 holds the three-dimensional image display device 2 by hand to move its position or the viewer himself/herself moves to search a position from which he/she can recognize the three-dimensional image, and observes the image. Note that the three-dimensional image 1 displayed on the display panel 6 may be either the static image or the moving picture.

In this embodiment, the definition X of the display panel 6 in the vertical direction is set so as to satisfy the expression 1, so that the definition of the three-dimensional image becomes no more than the resolution of the viewer's eyesight when displaying the image. Consequently, this prevents the viewer from failing to see the feature points that he/she should be able to see and prevents the viewer from becoming fatigued. This is more effective particularly when displaying the three-dimensional moving picture. The moving picture changes its image from time to time, and the binocular fusion does not catch up with the changes of image if the viewer takes much time in searching the feature points. As a result, the viewer is fatigued very much because the binocular rivalry constantly occurs. In this embodiment, on the other hand, searching of the feature points is done quickly to facilitate the binocular vision as described above, so that the viewer can easily recognize the three-dimensional moving picture.

Although, in this embodiment, the display panel 6 only has the pixels 23 for the right eye displaying the image for the right eye and the pixels 24 for the left eye displaying the image for the left eye, the display panel may comprise pixels of one or more types displaying another image. This allows the panel to perform multiple viewpoints display.

Further, the transmissive liquid crystal display panel has been used as the display panel in this embodiment, but the present invention is not limited to this, and a reflective liquid crystal display panel or a semi-transmissive liquid crystal display panel where each pixel is provided with a transmissive region and a reflective region may be used. Additionally, the drive method of the liquid crystal display panel may be either an active matrix type such as a TFT (Thin Film Transistor) type and a TFD (Thin Film Diode) type, or a passive matrix type such as an STN (Super Twisted Nematic liquid crystal) type. Moreover, as the display panel, a display panel other than the liquid crystal display panel, which is an organic electroluminescence display panel, a plasma display panel, a CRT (Cathode-Ray Tube) display panel, an LED (Light Emitting Diode) display panel, a field emission display panel, or a PALC (Plasma Address Liquid Crystal), for example, may be used.

Figure 8:
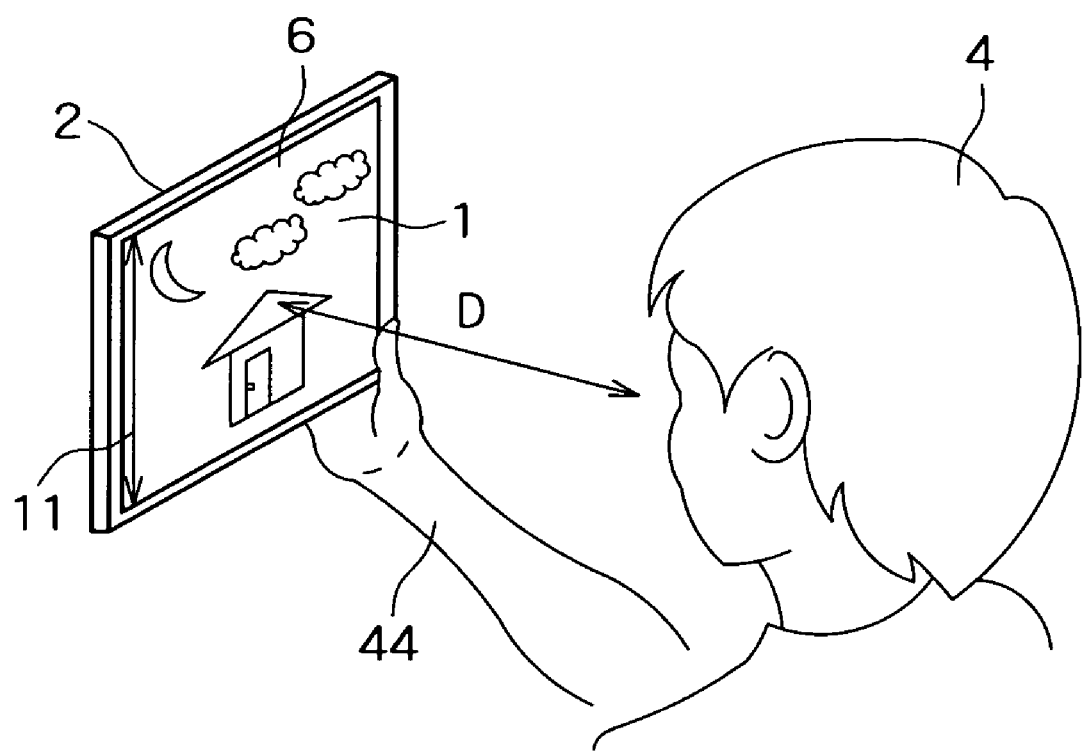
FIG. 8 is a perspective view showing the three-dimensional image display method in a second embodiment of the present invention.

Next, a second embodiment of the present invention will be described. FIG. 8 is the perspective view showing another three-dimensional image display method in this embodiment. In this embodiment, the definition of the display panel in the vertical direction is set to 175 dpi and the observation distance is set to 500 mm. This allows the viewer to holds the three-dimensional image display device 2 by hand 44 and observe the three-dimensional image 1 while he/she moves. The configuration, the operation and the effect in this embodiment other than the above-described one are the same as those of the above-described first embodiment.

Next, a third embodiment of the present invention will be described. In this embodiment, the definition X in both the vertical direction 11 and the horizontal direction 12 of display plane of the display panel 6, unlike the above-described first embodiment, is set so as to satisfy the expression 1. The definition in the vertical direction 11 is the number of the pixels 23 for the right eye per 1 inch, for example. Further, the definition in the horizontal direction 12 is the number of groups, where each group consists of one each of the pixel 23 for the right eye and the pixel 24 for the left eye, per 1 inch.

In this embodiment, the reduction of feature points is prevented more surely and the viewer's fatigue can be reduced more effectively with the above-described configuration. The configuration, the operation and the effect in this embodiment other than the above-described one are the same as those of the above-described first embodiment.

Figure 9:
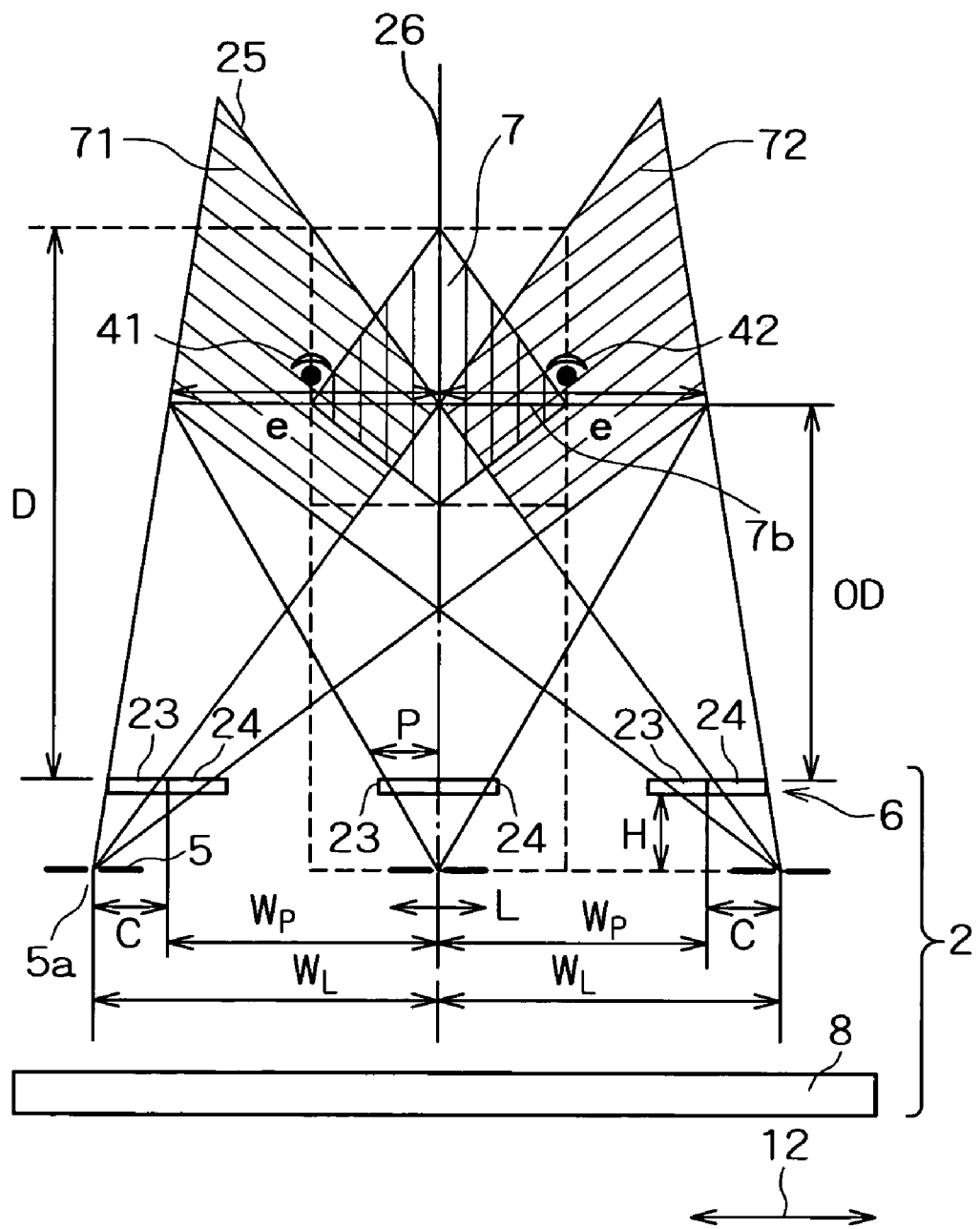
FIG. 9 is a view showing an optical model of the three-dimensional image display device in a fourth embodiment of the present invention, which shows a case where the width of slits is negligibly small.
Figure 10:
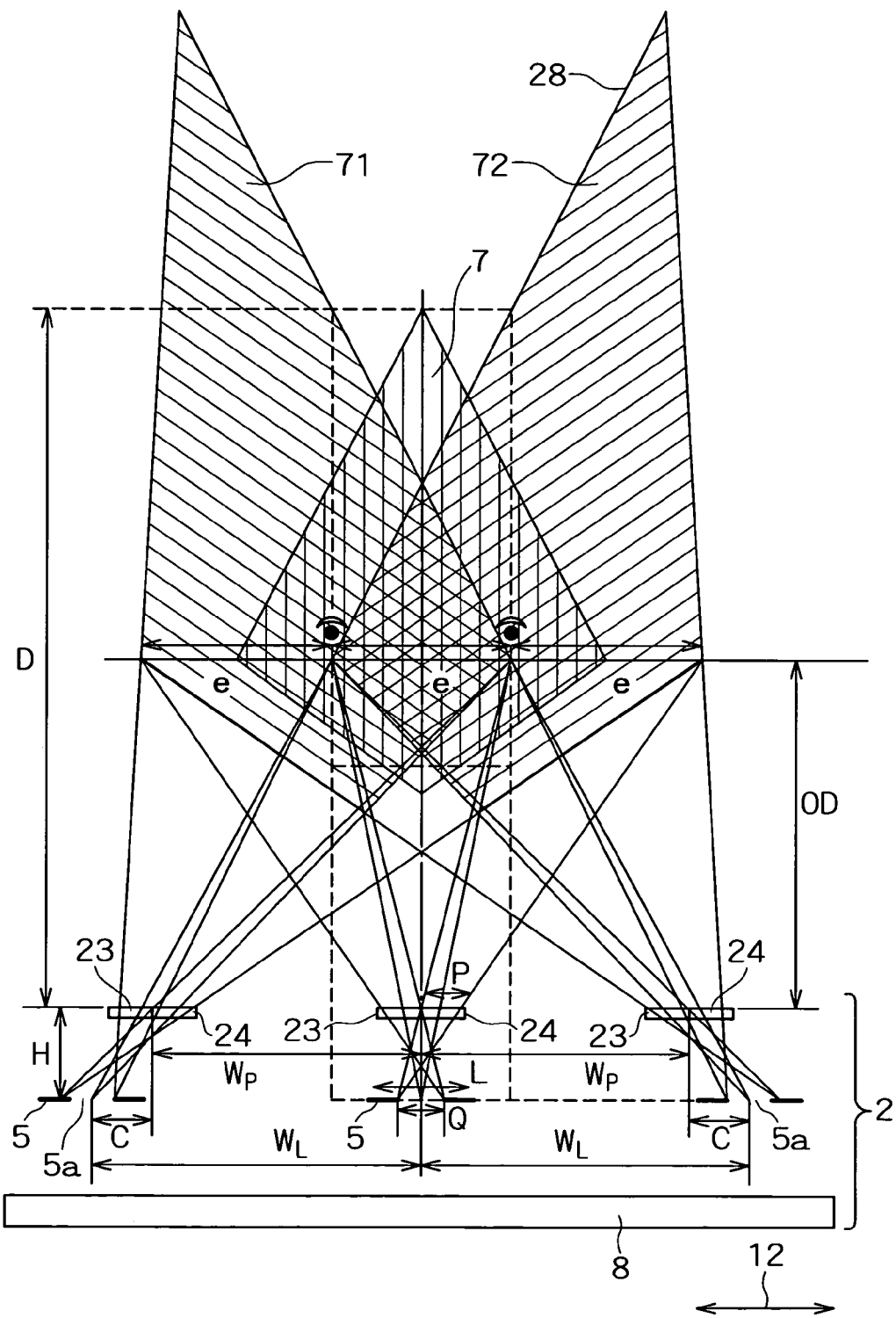
FIG. 10 is a view showing another optical model of the three-dimensional image display device in this embodiment, which shows a case where the width of slits is the limited value Q.

Next, a fourth embodiment of the present invention will be described. FIGS. 9 and 10 are the view showing the optical models of the three-dimensional image display device in this embodiment, where FIG. 9 shows the case where the width of slits is negligibly small and FIG. 10 shows the case where the width of slits is the limited value Q. As shown in FIG. 9, the three-dimensional image display device according to this embodiment is provided with the parallax barrier 5 on the rear side of the display panel 6. Specifically, the display panel 6, the parallax barrier 5, and the light source 8 are provided sequentially from the viewer side. The configuration in this embodiment other than the above-described one is the same as that of the above-described first embodiment.

Next, the definition of the observation distance in this embodiment will be described. First, the case where the width of the slits 5a is minimal and negligible will be described as shown in FIG. 9. Similar to the above-described first embodiment, the array pitch of the slits 5a of the parallax barrier 5 is set to L, the distance between the display panel 6 and the parallax barrier 5 is set to H, and the array pitch of the pixel groups of the display panel 6 is set to P. Further, the distance between the most remote point from the display panel 6 and the display panel 6 in the three-dimensional visible range 7 is set to the maximum observation distance D, and the distance between the intersection 7a in the three-dimensional visible range 7 and the display panel 6 is set to the optimal observation distance OD. Moreover, the expanded projection width of one pixel on the optimal observation plane 7b is set to the binocular interval e of the viewer, for example. Accordingly, the following expression 22 and the expression 23 hold.

$$P:H=e:(OD+H) \qquad \text{(Expression 22)}$$

$$H = OD \times \frac{P}{e-P} \qquad \text{(Expression 23)}$$

Still further, supposing the distance between the center of a pixel group located at the center in the horizontal direction 12 of the display panel 6 and the center of a pixel group located at the end in the horizontal direction 12 is $W_P$, and the distance between the centers of slits 5a severally corresponding to the pixel groups is $W_L$, the difference C between the distance $W_P$ and the distance $W_L$ is given by the following expression 24. Further, supposing the number of pixels included in the distance $W_P$ of the display panel 6 is 2m, the expression 7 holds, and the following expression 25 and expression 26 hold as a result.

$$W_L - W_P = C \qquad \text{(Expression 24)}$$

$$W_L:(OD+H)=W_P:OD \qquad \text{(Expression 25)}$$

$$L = 2 \times P \times \frac{OD+H}{OD} \qquad \text{(Expression 26)}$$

On the other hand, to calculate the maximum observation distance D, the distance between a point that is remote from the optical system center line 26 by the distance of (e/2) in the left direction of the drawing in the light ray 25, which is emitted from the slit 5a located at the far right of the drawing on the parallax barrier 5 and transmitted the right end of the pixel 23 for the right eye located on the far right of the display panel 6, and the display panel 6 is to be found, as shown in FIG. 9. The following expression 27 and expression 28 hold from the geometrical relationship shown in FIG. 9. Furthermore, the following expression 29 is calculated from the expression 25 and the following expression 28.

$$W_P:OD + \left(W_P + \frac{e}{2}\right):D \qquad \text{(Expression 27)}$$

$$D = OD \times \frac{W_P + \frac{e}{2}}{W_P} \qquad \text{(Expression 28)}$$

$$D = \frac{H}{C} \times \left(W_P + \frac{e}{2}\right) \qquad \text{(Expression 29)}$$

The above-described description has been made for the case where the width of the slit 5a is minimal and negligible, but the case has a problem that display is dark due to the narrow slit width although crosstalk between the image for left eye and the image for right eye is small. For this reason, the limited width is actually given to the slits 5a as shown in FIG. 10 to increase the brightness of display. Next, the description will be made for a case where the width of the slits 5a is taken in consideration.

In FIG. 10, when the X-Y orthogonal coordinate system having the surface of the display panel 6 as the X axis and the optical system center line as the Y axis, light ray 28 that has been emitted from the right end of the slit 5a, which is located at the far left of the drawing on the parallax barrier 5, and transmits the left end of the pixel 24 for left eye located at the far left of the display panel 6, is given by the following expression 30.

$$y = \frac{H}{C - \frac{Q}{2}} \times x + \frac{H \times W_P}{C - \frac{Q}{2}} \quad \text{(Expression 30)}$$

Then, at this point, the maximum observation distance D becomes a value of the Y coordinate at the intersection of the light ray 28 and a straight line x=(e/2). Therefore, when x=(e/2) is substituted in the expression 27, the maximum observation distance D is given by the following expression 31.

$$D = \frac{H}{C - \frac{Q}{2}} \times \left(W_P + \frac{e}{2}\right) \quad \text{(Expression 31)}$$

In FIG. 10, the width Q of the slit 5a is set such that the expanded projection width of one pixel on the optimal observation plane 7b becomes 2e, that is, twice the viewer's binocular interval. If the width Q of the slits 5a becomes larger, the crosstalk between the image for left eye and the image for right eye occurs at all observation points on the optimal observation plane 7b, which eliminates observation points having no crosstalk. For this reason, the width Q of the slit is not generally made larger than this. Specifically, this condition is a case where the width Q of the slits takes the maximum value. The width Q of the slits can be described as the following expression 32 and expression 33 from the geometrical relationship. Note that the distance H between the parallax barrier 5 and the display panel 6 and the array period L of the slits 5a of the parallax barrier 5 can be found by the expression 5 and expression 9 in the same manner as the above-described first embodiment.

$$Q:H = e:(OD - H) \quad \text{(Expression 32)}$$

$$Q = \frac{e \times H}{OD - H} \quad \text{(Expression 33)}$$

Note that the size of the three-dimensional visible range 7 depends on the latitude of the crosstalk and the aperture ratio of pixels, and the optical arrangement such that the expanded projection width of each pixel becomes 2e as shown in FIG. 10 is formed when the width Q of the slits 5a takes the maximum value as described above. Therefore, the following expression 34 holds from the geometrical relationship shown in FIG. 10, and the following expression 35 is derived from the following expression 34.

$$\left(W_P - \frac{e}{2}\right) : OD = \left(W_P + \frac{e}{2}\right) : D \quad \text{(Expression 34)}$$

$$D = OD \times \frac{W_P + \frac{e}{2}}{W_P - \frac{e}{2}} \quad \text{(Expression 35)}$$

Supposing the maximum observation distance D when the width Q of the slits is negligible is $D_{min}$ and the maximum observation distance D when the width Q of the slits takes the maximum value is $D_{max}$, the following expression 36 holds because $D_{min}$ is given by the expression 28 and $D_{max}$ is given by the expression 35. The following expression 37 is derived from the expression 36 and expression 29.

$$\frac{D_{max}}{D_{min}} = \frac{W_P}{W_P - \frac{e}{2}} \quad \text{(Expression 36)}$$

$$D_{max} = \frac{H}{C} \times W_P \times \frac{W_P + \frac{e}{2}}{W_P - \frac{e}{2}} \quad \text{(Expression 37)}$$

As described above, the maximum observation distance D has been defined in the case where the width of the slits 5a is the smallest and the largest. Actually, the width of the slits is designed within the range between the above-described minimum value and maximum value depending on the latitude of crosstalk between the right and left images, the aperture ratio of pixels, the brightness of display, and the like. In such a case, the expanded projection width of one pixel is within the range from the binocular interval (e) to twice (2e) the binocular interval. Note that the above-described description is for the case where the opening portions of the parallax barrier are in the slit shape, but it can be applied for a case where the opening portions are in a pinhole shape as well.

Next, the operation of the three-dimensional image display device according to this embodiment, that is, the three-dimensional image display method will be described. As shown in FIGS. 4 and 9, the display panel 6 displays the three-dimensional image 1 first as the light source 8 turns on. Specifically, the pixels 23 for the right eye on the display panel 6 display the image for the right eye and the pixels 24 for the left eye display the image for the left eye. Next, the viewer 4 positions the midpoint 43 between the right eye 41 and the left eye 42 at the observation point in the three-dimensional visible range 7, which is an observation point 400 mm apart from the display panel 6, for example. At this point, the light source 8 outputs light toward the parallax barrier 5, the light passes the slits 5a of the parallax barrier 5, and is made incident to the pixels 23 for the right eye and the pixels 24 for the left eye. The light that has been made incident to the pixels 23 for the right eye transmits them, and is made incident to the viewer's right eye 41. On the other hand, the light that has been made incident to the pixels 24 for the left eye transmits them, and is made incident to the viewer's left eye 42. Thus, the viewer recognizes the three-dimensional image 1. The operation in this embodiment other than the above-described one is the same as that of the first embodiment.

In this embodiment, since the parallax barrier is provided on the rear side of the display panel, the parallax barrier does not become an eyesore when the viewer observes the three-dimensional image 1, so that the visibility is superior comparing to the above-described first embodiment. The effect in this embodiment other than the above-described one is the same as that of the first embodiment.

Figure 11:
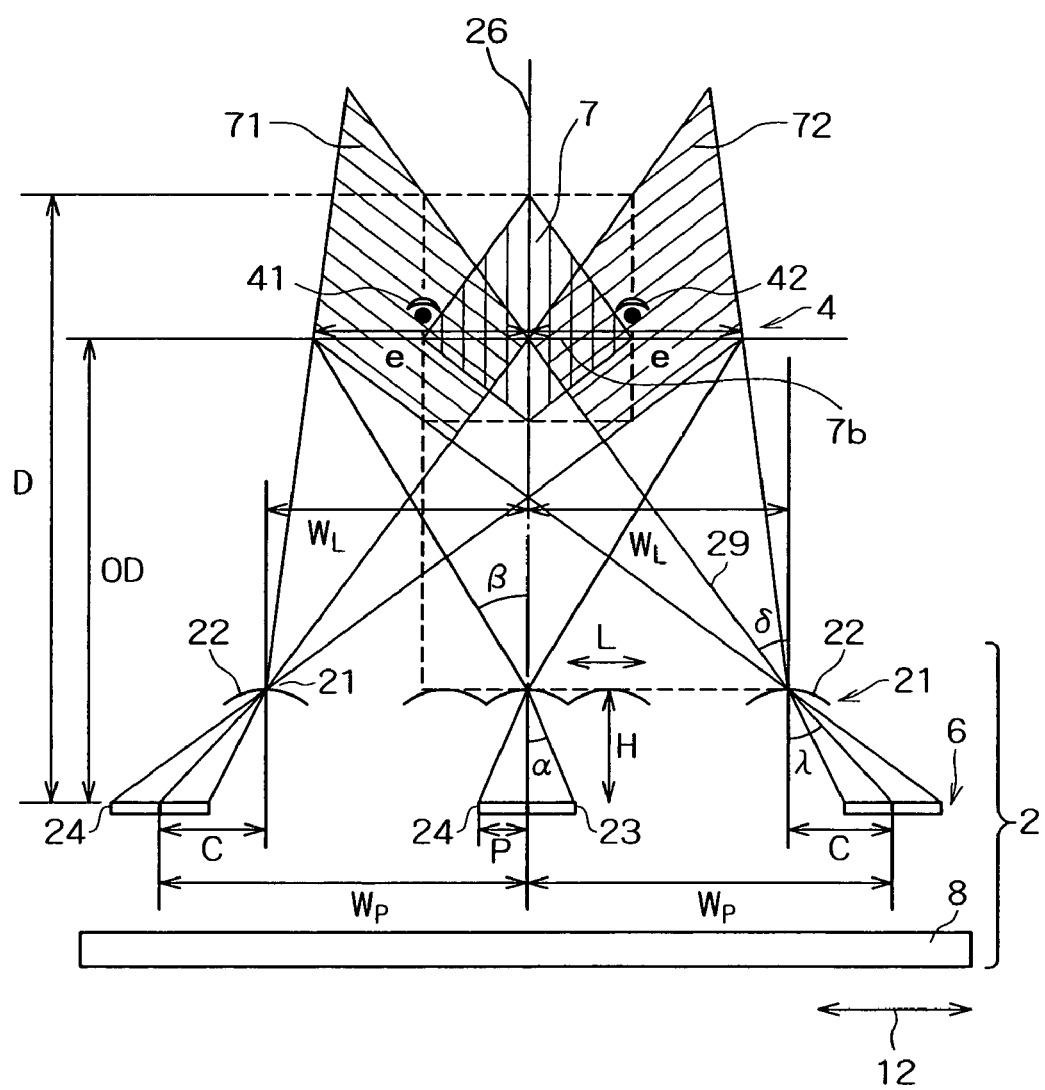
FIG. 11 is a view showing an optical model of the three-dimensional image display device in a fifth embodiment of the present invention.

Next, a fifth embodiment of the present invention will be described. FIG. 11 is the view showing the optical model of the three-dimensional image display device in this embodiment. Further, the three-dimensional image display method according to this embodiment is as shown in FIG. 4. As shown in FIG. 11, the three-dimensional image display device according to this embodiment is provided with the lenticular lens 21, the display panel 6, and the light source 8 sequentially from the viewer side, in which the lenticular lens 21 contacts the display panel 6 and the pixels of the display panel 6 are located on the focal plane of the lenticular lens 21. The configuration of the display panel 6 and the light source 8 are the same as those of the above-described first embodiment.

In the lenticular lens 21, a plurality of cylindrical lenses (convex portions) 22, whose longitudinal directions are in the vertical direction 11 (refer to FIG. 4), are arrayed along the horizontal direction 12. The groups that consist of the pixels 23, 24 adjacent to each other correspond to each convex portion 22 of the lenticular lens 21.

Next, the definition of the observation distance in this embodiment will be described. An array pitch of the cylindrical lenses 22 of the lenticular lens 21 is set to L and the thickness of the lenticular lens 21, that is, the distance between the display panel 6 and the apex of the lenticular lens 21 is set to H. Further, the refraction index of the lenticular lens 21 is set to n. Furthermore, the array pitch of the pixels of the display panel 6 is set to P. Since the array pitch L of the cylindrical lenses 22 and the array pitch P of the pixels are mutually related, one pitch is determined based on the other one. Generally, since it is often the case that the lenticular lens is designed for the display panel, the array pitch P of the pixels is treated as a constant. Additionally, by selecting a material of the lenticular lens 21, the refraction index n is determined.

Still further, an incident angle from the end portion of a pixel group located at the center of the display panel 6 in the horizontal direction 12 to the center of a cylindrical lens 22 located at the center of the lenticular lens 21 in the horizontal direction 12 is set to α, an output angle from the center is set to β, an incident angle from the center of a pixel group located at the far right of the drawing in the horizontal direction 12 of the display panel 6 to the center of a cylindrical lens 22 located at the far right of the drawing in the horizontal direction 12 of the lenticular lens 21 is set to γ, and an output angle from the center is set to δ. The angle of 1' in expression 1 for definition, X, corresponds to angle α. Moreover, the distance between the center of the pixel group located at the center in the horizontal direction 12 of the display panel 6 and the center of the pixel group located at the end in the horizontal direction 12 is set to $W_P$, and the distance between the centers of the cylindrical lenses 22 severally corresponding to the pixel groups is set to $W_L$. The tangent of α, as shown in FIG. 11, would be (P/H). X corresponds the to horizontal direction in the display panel. Y corresponds to the vertical direction in the display panel and is not shown in the 2 dimensional X-Z perspective of FIG. 11. Note that the definition of the three-dimensional visible range 7, the optimal observation distance OD, the maximum observation distance D, the optimal observation plane 7b, and the binocular interval e is the same as the above-described first embodiment (refer to FIG. 5)

Next, a distance H between the lenticular lens 21 and the display panel 6 is determined using each of the above-described values. The following expressions 38 to 43 hold based on Snell's law and the geometrical relationship shown in FIG. 11.

$n \times \sin α = \sin β$ (Expression 38)

$(OD-H) \times \tan β = e$ (Expression 39)

$H \times \tan α = P$ (Expression 40)

$n \times \sin γ = \sin δ$ (Expression 41)

$H \times \tan γ = C$ (Expression 42)

$(OD-H) \times \tan δ = W_L$ (Expression 43)

Further, the difference C between the distance $W_P$ and the distance $W_L$ is given by the following expression 44. Furthermore, supposing the number of pixels included in the distance $W_P$ of the display panel 6 is 2m, the following expression 45 holds. Still Further, since the expression 43 holds from the geometrical relationship, the pitch of the slits 5a of the parallax barrier 5 is given by the expression 9.

$W_P - W_L = C$ (Expression 44)

$W_P = 2 \times m \times P, W_L = m \times L$ (Expression 45)

The viewer can recognize the three-dimensional image when the viewer's right eye 41 positions in the right eye area 71 and the left eye 42 positions in the left eye area 72. However, since the binocular interval of the viewer is fixed, he/she cannot position the right eye 41 and the left eye 42 severally on any position of the right eye area 71 and the left eye area 72, such position is limited to the region where the binocular interval can be held at a fixed value. Specifically, binocular vision is realized only when the midpoint 43 between the right eye 41 and the left eye 42 is located within the three-dimensional visible range 7. The length of the three-dimensional visible range 7 along the horizontal direction 12 becomes a maximum at the position where the distance from the display panel 6 is the optimal observation distance OD, so that latitude when the viewer's position is shifted in the horizontal direction 12 becomes a maximum. For this reason, the position where the distance from the display panel 6 becomes the optimal observation distance OD is the most ideal observing position.

On the other hand, to calculate the maximum observation distance D, the distance between a point that is remote from the optical system center line 26 by the distance of (e/2) in the left direction of the drawing in light ray 29, which is emitted from the left end of the pixel 23 for right eye located at the far right of the drawing on the display panel 6, and the display panel 6 is to be found, as shown in FIG. 11. The following expression 46 and expression 47 hold from the geometrical relationship shown in FIG. 11. Furthermore, the following expression 48 is calculated from the expression 43 and the following expression 47.

$$W_L : (OD - H) = \left(W_L + \frac{e}{2}\right) : (D - H) \quad \text{(Expression 46)}$$

$$D = (OD - H) \times \frac{W_L + \frac{e}{2}}{W_L} + H \quad \text{(Expression 47)}$$

$$D = \frac{1}{\tan δ} \times \left(W_L + \frac{e}{2}\right) + H \quad \text{(Expression 48)}$$

Note that the above-described explanation is for the case where the lens is the lenticular lens, but it can be applied for a case where the lens is a fly-eye lens as well.

As described above, the maximum observation distance D of the three-dimensional image display device 2 has been defined based on the configuration of the three-dimensional image display device 2. With the maximum observation distance D, the definition X (dpi) of the display panel 6 in the vertical direction 11 is set so as to satisfy the expression 1. In short, the definition in the vertical direction 11, that is, the number of pixels 23 for the right eye per 1 inch is a value, where 25.4 (mm/inch) is divided by the product of the distance D (mm) and the tangent of the angle of 1 minute, or more. In this embodiment, the maximum observation distance D is set to 500 mm, for example, and the definition X in the vertical direction 11 is set to 175 dpi or more, which is 230 dpi, for example.

Next, the operation of the three-dimensional image display device according to this embodiment, that is, the three-dimensional image display method will be described. As shown in FIGS. 4 and 11, the viewer 4 firstly positions the midpoint 43 between the right eye 41 and the left eye 42 at an observation point in the three-dimensional visible range 7, which is an observation point 400 to 500 mm apart from the display panel 6, for example. Then, the display panel 6 displays the three-dimensional image 1. In other words, the pixels 23 for the right eye and the pixels 24 for the left eye of the display panel 6 display the image for the right eye and the image for the left eye, respectively. Then, the light source 8 outputs light toward the display panel 6. The light is made incident to the pixels 23 for the right eye and the pixels 24 for the left eye. The light that has been made incident to the pixels 23 for the right eye transmits them, is refracted at each cylindrical lens 22 of the lenticular lens 21, and made incident to the viewer's right eye 41. Further, the light that has been made incident to the pixels 24 for the left eye transmits them, is refracted at the cylindrical lens 22, and made incident to the viewer's left eye 42. Thus, the viewer can recognize the three-dimensional image 1.

In this embodiment, since the lenticular lens is used as the optical unit instead of the parallax barrier, where loss of light emitted from the light source 8 does not occur and which is efficient comparing to the above-described first embodiment. The effect in this embodiment other than the above-described one is the same as that of the above-described first embodiment.

In the following, the effect of the example of the present invention will be specifically described comparing to a comparative example that departs from the scope of claim of the invention. To verify the effect of the present invention, two types of three-dimensional images were displayed on the three-dimensional image display device and 10 test subjects conducted subjective evaluation. The three-dimensional image display device was arranged at a position where the observation distance, that is, the distance between the display panel and the viewer becomes 500 mm. Supposing the eyesight of the viewer is 1.0, the resolution of the eyes at this observation distance is 175 dpi.

In the example of the present invention, the definition in the vertical direction and the definition in the horizontal direction of the images were set to 230 dpi and 115 dpi, respectively. Specifically, only the definition in the vertical direction was set to the same or more than the resolution of the eyes. On the other hand, the definition in the vertical direction and the definition in the horizontal direction of the images were set to 128 dpi and 64 dpi, respectively in the comparative example. Specifically, the definition was set less than the resolution of the eyes in both vertical and horizontal directions.

Then, the 10 test subjects viewed the two types of the three-dimensional images, and evaluated the visibility (eye-friendliness) on a 5-step evaluation scale. Table 2 shows criteria of the evaluation scale, and Table 3 shows an evaluation result.

TABLE 2

| Score | Content |
| --- | --- |
| 5 | Excellent |
| 4 | Good |
| 3 | Fair |
| 2 | Poor |
| 1 | Very poor |

TABLE 3

| Test subject | A | B | C | D | E | F | G | H | I | J | Average value |
| --- | --- | --- | --- | --- | --- | --- | --- | --- | --- | --- | --- |
| Embodiment | 5 | 4 | 4 | 5 | 5 | 4 | 5 | 4 | 4 | 3 | 4.3 |
| Comparative example | 3 | 2 | 2 | 3 | 2 | 2 | 3 | 1 | 2 | 1 | 2.1 |

As shown in Table 3, the average value of the test subjects' score was 4.3 in the example of the present invention, and the average value of the comparative examples' score was 2.1. Therefore, the result proved that the images in the example of the present invention had been superior in the visibility comparing to the images in the comparative examples. Specifically, the experiment verified that the binocular vision has been performed significantly easily when the lack of the corresponding feature points was prevented only in one direction of the three-dimensional image. As described above, superiority in the visibility means that it reduces the fatigue of the viewer consequently.

Given that the prevention of the lack of feature points only in one direction is effective in improving the visibility, it is obvious that the lack of feature points in both vertical and horizontal directions exerts the effect of reducing the fatigue of the viewer.

What is claimed is:

1. A three-dimensional image display device, comprising:
a display panel where a plurality of pixel sections, each of which includes pixels displaying an image for a right eye and pixels displaying an image for a left eye, are arrayed in matrix form, the pixels sections being periodically arranged in a horizontal direction; and
an optical unit that emits light emitted from the pixels displaying said image for the right eye and light emitted from the pixels displaying said image for the left eye in directions different from each other,
wherein a three-dimensional visible range is defined as positions where a midpoint between a viewer's right eye and left eye is positioned such that the light emitted from the pixels displaying said image for the right eye is made incident to said right eye and the light emitted from the pixels displaying said image for the left eye is made incident to said left eye, and
wherein the pixel sections are arrayed such that a number of pixel sections per inch in the horizontal direction or the definition X of the pixel sections, is configured such that a definition of the image in the horizontal direction (X) as projected in the three-dimensional visible range when D(mm), which is defined as the distance between said display panel and a point which is most distant from said display panel within said three-dimensional visible range, is set to satisfy the equation below, so that viewing angles of images of pixel sections incident to the right and left eyes are smaller than or equal to 1 minute: $X > 25.4/D * \tan(1')$.

2. The three-dimensional image display device according to claim 1, wherein pixel sections are arrayed such that a number of said pixel sections per inch in the vertical direction is configured such that a resolution of the image in the vertical direction as projected in the three-dimensional visible range is no less than the resolution of the eyesight of a viewer whose midpoint between the right eye and the left eye is positioned in said three-dimensional visible range.

3. The three-dimensional image display device according to claim 2, when D(mm) is defined as the distance between said display panel and a point which is most distant from said display panel within said three-dimensional visible range, the number of pixel sections per inch (M) in said vertical direction satisfies the expression of:

$M \geq 25.4/D*\tan(1')$.

4. The three dimensional image display device according to claim 3, wherein the optical unit is a lenticular lens having a refracting index n, wherein when the pitch of a pixel section is defined as "2P", an interval between the right eye and the left eye is defined as "e", a distance between the lenticular lens and the pixel section is defined as "H", an incident angle from the end portion of a pixel group located at the center of the display panel in a horizontal direction to a center of a cylindrical lens located at the center of the lenticular lens in a horizontal direction is defined as "α", an output angle from the center of the lenticular lens is defined as "β", and a maximum observation distance is defined as "D", the following expressions are satisfied, $n \times \sin\alpha = \sin\beta$ $(D-H) \times \tan\beta = e$ $H \times \tan\alpha = P$.

5. The three-dimensional image display device according to claim 1, wherein said display panel is a liquid crystal display panel.

6. The three-dimensional image display device according to claim 1, wherein said optical unit is a parallax barrier wherein a plurality of slits are periodically arranged in said horizontal direction.

7. The three-dimensional image display device according to claim 1, wherein said optical unit is a lenticular lens that is arranged on the viewer side of said display panel, provided with a plurality of cylindrical lenses extended in a vertical direction and periodically arranged in said horizontal direction.

8. The three-dimensional image display device according to claim 1, wherein said device displays a three-dimensional moving picture.

9. The three-dimensional image display device according to claim 1, wherein said device is mounted in a portable device.

10. The three-dimensional image display device according to claim 9, wherein said portable device is any one of a cellular phone, a portable terminal, a PDA, a game device, a digital camera, and a digital video camera.

11. The three dimensional image display device according to claim 1, wherein the optical unit is a lenticular lens having a refracting index n, wherein when the pitch of a pixel section is defined as "2P", an interval between the right eye and the left eye is defined as "e", a distance between the lenticular lens and the pixel section is defined as "H", an incident angle from the end portion of a pixel group located at the center of the display panel in a horizontal direction to a center of a cylindrical lens located at the center of the lenticular lens in a horizontal direction is defined as "α", an output angle from the center of the lenticular lens is defined as "β", and a maximum observation distance is defined as "D", the following expressions are satisfied, $n \times \sin\alpha = \sin\beta$ $(D-H) \times \tan\beta = e$ $H \times \tan\alpha = P$.

12. A three-dimensional image display method, wherein:

arraying a plurality of pixel sections in matrix form on a display panel, in which one pixel included in each pixel section displays an image for a right eye and another pixel displays an image for a left eye, the pixels displaying said image for the fight eye and the pixels displaying said image for the left eye being periodically arranged in a horizontal direction;

controlling light emitted from said pixel sections with an optical unit such that light emitted from the pixels displaying said image for the right eye and light emitted from the pixels displaying said image for the left eye, are in directions different from each other, and positioning a midpoint between the right eye and the left eye in a three-dimensional visible range, such that the light emitted from the pixels displaying said image for the right eye is made incident to said right eye and the light emitted from the pixels displaying said image for the left eye is made incident to said left eye, wherein the pixel sections are arrayed such that a number of pixel sections per inch in the horizontal direction or the definition X of the pixel sections, is configured such that a definition of the image in the horizontal direction (X) as projected in the three-dimensional visible range when D(mm), which is defined as the distance between said display panel and a point which is most distant from said display panel within said three-dimensional visible range, is set to satisfy the equation below, so that viewing angles of images of pixel sections incident to the right and left eyes are smaller than or equal to 1 minute: $X > 25.4/D*\tan(1')$.

13. The three-dimensional image display method according to claim 12, wherein the pixels sections are arrayed such that a number of said pixel sections per inch in the vertical direction is configured such that a resolution of the image in the vertical direction as projected in the three-dimensional visible range is no less than the resolution of the eyesight of a viewer whose midpoint between the right eye and the left eye is positioned in said three-dimensional visible range.

14. The three-dimensional image display device according to claim 13 when D(mm) is defined as the distance between said display panel and a point which is most distant from said display panel within said three-dimensional visible range, the number of pixel sections per inch (M) in said vertical direction satisfies the expression of:

$M \geq 25.4/D*\tan(1')$.

15. A three-dimensional image display device, comprising:

a display panel where a plurality of pixel sections, which include pixels displaying an image for a right eye and pixels displaying an image for a left eye, are arrayed in matrix form; and an optical unit that emits light emitted from the pixels displaying said image for the right eye and light emitted from the pixels displaying said image for the left eye in directions different from each other, wherein when a three-dimensional visible range is defined as positions where a midpoint between a viewer's right eye and left eye is positioned such that the light emitted from the pixels displaying said image for the right eye is made incident to said right eye and the light emitted from the pixels displaying said image for the left eye is made incident to said left eye, D (mm) is defined as the distance between said display panel and a point which is most distant from said display panel within said three-dimensional visible range, X (dpi): Degree of definition of the pixel sections in the direction where the pixels for the right eye and pixels for the left eye are alternately arrayed;

Y (dpi): the degree of definition of the pixel sections in the direction orthogonal to the direction in which X is set;

$X > 25.4/\{D \times \tan(1')\}$;

$D \leq 500$ mm; and $X:Y = 1:2$.

16. The three-dimensional image display device according to claim 15,
wherein said display panel is a liquid crystal display panel.

17. The three-dimensional image display device according to claim 15,
wherein said optical unit is a parallax barrier where a plurality of slits, which are arranged for each row of said pixel sections and extend along an extending direction of the row, are formed.

18. The three-dimensional image display device according to claim 15,
wherein said optical unit is a lenticular lens that is arranged on the viewer side of said display panel, provided with a plurality of cylindrical lenses arranged for each row of said pixel sections and extended along an extending direction of the row.

19. The three-dimensional image display device according to claim 15, wherein said device displays a three-dimensional moving picture.

20. A three-dimensional image display method, in which one pixel of plural pixels included in each of a plurality of pixel sections, which are arrayed in matrix form on a display panel, displays an image for a right eye and another pixel of said plural pixels displays an image for a left eye, an optical unit emits light emitted from the pixels displaying said image for the right eye and light emitted from the pixels displaying said image for the left eye in directions different from each other, and a viewer positions a midpoint between the right eye and the left eye in a three-dimensional visible range, such that the light emitted from the pixels displaying said image for the right eye is made incident to said right eye and the light emitted from the pixels displaying said image for the left eye is made incident to said left eye, wherein D (mm) is defined as the distance between said midpoint and said display panel;

X (dpi): Degree of definition of the pixel sections in the direction where the pixels for the right eye and pixels for the left eye are alternately arrayed;

Y (dpi): the degree of definition of the pixel sections in the direction orthogonal to the direction in which X is set;

$X > 25.4/\{D \times \tan(1')\}$;

$D \leq 500$ mm; and $X:Y = 1:2$.

* * * * *